(12) United States Patent
Edge

(10) Patent No.: US 10,846,336 B2
(45) Date of Patent: Nov. 24, 2020

(54) AUTHORING TOOLS FOR SYNTHESIZING HYBRID SLIDE-CANVAS PRESENTATIONS

(71) Applicant: Microsoft Technology Licensing, LLC, Redmond, WA (US)

(72) Inventor: Darren Edge, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 323 days.

(21) Appl. No.: 15/513,530

(22) PCT Filed: Oct. 30, 2014

(86) PCT No.: PCT/CN2014/089866
§ 371 (c)(1),
(2) Date: Mar. 22, 2017

(87) PCT Pub. No.: WO2016/065567
PCT Pub. Date: May 6, 2016

(65) Prior Publication Data
US 2017/0316091 A1    Nov. 2, 2017

(51) Int. Cl.
*G06F 16/00* (2019.01)
*G06F 16/783* (2019.01)
(Continued)

(52) U.S. Cl.
CPC ........ *G06F 16/7844* (2019.01); *G06F 16/345* (2019.01); *G06F 16/433* (2019.01);
(Continued)

(58) Field of Classification Search
CPC ............. G06F 16/7844; G06F 16/4393; G06F 16/433; G06F 16/34; G06F 17/21; G06F 17/211; G06F 17/229; G06F 17/2264
(Continued)

(56) References Cited

U.S. PATENT DOCUMENTS

| 5,574,798 A | 11/1996 | Greer et al. |
| 6,084,582 A | 7/2000 | Qureshi et al. |

(Continued)

FOREIGN PATENT DOCUMENTS

| CN | 1841549 A | 10/2006 |
| CN | 102081946 A | 6/2011 |

(Continued)

OTHER PUBLICATIONS

Batts, Charles T., A beamer tutorial in beamer, https://www.uncg.edu/cmp/reu/presentations/Charles%20Batts%20-%20Beamer%20Tutorial.pdf, Apr. 4, 2007, pp. 1-110.

(Continued)

*Primary Examiner* — Thanh-Ha Dang
(74) *Attorney, Agent, or Firm* — Alleman Hall Creasman & Tuttle LLP

(57) ABSTRACT

Presentation synthesis implementations are presented that generally build a slide presentation based on a hierarchical outline of textual presentation elements. These elements are spatially mapped onto a canvas that provides a master layout for slides. This mapping is accomplished use a set of canvas layout and size rules. Each presentation text element is illustrated by a slide that visually combines canvas text and in one version supporting content items (e.g., text, image, video, and so on). The slides are generated using both the set of canvas rules, and a set of slide style rules. A systematic traversal of the text elements determines the slide path. Slides are styled to highlight the current focus element as the presenter moves through the presentation and can be zoomed out to the canvas to give context during delivery.

18 Claims, 8 Drawing Sheets

(51) Int. Cl.
*G06F 16/432* (2019.01)
*G06F 16/438* (2019.01)
*G06F 16/34* (2019.01)
*G06F 40/10* (2020.01)
*G06F 40/103* (2020.01)
*G06F 40/131* (2020.01)
*G06F 40/151* (2020.01)

(52) U.S. Cl.
CPC .......... *G06F 16/4393* (2019.01); *G06F 40/10* (2020.01); *G06F 40/103* (2020.01); *G06F 40/131* (2020.01); *G06F 40/151* (2020.01)

(58) Field of Classification Search
USPC .................................................. 707/794
See application file for complete search history.

(56) References Cited

U.S. PATENT DOCUMENTS

| | | | |
|---|---|---|---|
| 6,453,302 B1* | 9/2002 | Johnson | G06Q 30/02 705/27.2 |
| 6,580,438 B1 | 6/2003 | Ichimura et al. | |
| 6,774,920 B1 | 8/2004 | Cragun | |
| 7,299,418 B2 | 11/2007 | Dieberger | |
| 7,342,586 B2 | 3/2008 | Jaeger | |
| 7,428,704 B2* | 9/2008 | Baker | G06F 40/186 715/730 |
| 7,549,120 B1 | 6/2009 | Griffith et al. | |
| 7,714,802 B2 | 5/2010 | Hurley et al. | |
| 7,870,503 B1 | 1/2011 | Levy et al. | |
| 7,996,436 B2* | 8/2011 | Schneider | G06F 16/40 707/802 |
| 8,166,402 B2* | 4/2012 | Collins | G06F 40/166 715/732 |
| 8,269,790 B2* | 9/2012 | Wong | G06T 11/60 345/619 |
| 9,043,722 B1 | 5/2015 | Holt | |
| 9,093,007 B2 | 7/2015 | Berglund | |
| 9,619,128 B2 | 4/2017 | Edge et al. | |
| 10,185,473 B2* | 1/2019 | Pandy | G06F 3/0484 |
| 10,360,925 B2* | 7/2019 | Basson | G10L 25/27 |
| 2001/0021938 A1 | 9/2001 | Fein et al. | |
| 2002/0194230 A1 | 12/2002 | Polanyi et al. | |
| 2003/0122863 A1 | 7/2003 | Dieberger et al. | |
| 2003/0202007 A1 | 10/2003 | Silverstein et al. | |
| 2004/0148571 A1* | 7/2004 | Lue | G06F 16/9577 715/239 |
| 2004/0267387 A1 | 12/2004 | Samadani | |
| 2005/0066059 A1 | 3/2005 | Zyburam et al. | |
| 2005/0208619 A1 | 5/2005 | Theall et al. | |
| 2005/0193323 A1 | 9/2005 | Coulomb et al. | |
| 2005/0223314 A1 | 10/2005 | Varadarajan et al. | |
| 2005/0246313 A1 | 11/2005 | Turski et al. | |
| 2006/0036568 A1 | 2/2006 | Moore | |
| 2006/0044324 A1* | 3/2006 | Shum | H04N 9/76 345/595 |
| 2006/0066632 A1* | 3/2006 | Wong | G06F 3/0482 345/619 |
| 2006/0200759 A1 | 9/2006 | Agrawala et al. | |
| 2007/0055926 A1 | 3/2007 | Christiansen et al. | |
| 2007/0055939 A1* | 3/2007 | Furlong | G06Q 10/10 715/731 |
| 2007/0073532 A1 | 3/2007 | Brockett et al. | |
| 2007/0118506 A1 | 5/2007 | Kao et al. | |
| 2007/0130177 A1* | 6/2007 | Schneider | G06F 16/40 |
| 2007/0171201 A1 | 7/2007 | Pi et al. | |
| 2008/0034345 A1 | 2/2008 | Curtis et al. | |
| 2008/0040340 A1* | 2/2008 | Varadarajan | G06F 40/186 |
| 2008/0282147 A1* | 11/2008 | Schorr | G06F 40/106 715/247 |
| 2009/0044117 A1 | 2/2009 | Vaughan et al. | |
| 2009/0100369 A1 | 4/2009 | Mindrum | |
| 2009/0109451 A1* | 4/2009 | Sawada | H04N 1/56 358/1.9 |
| 2009/0172548 A1 | 7/2009 | Screen | |
| 2009/0172559 A1* | 7/2009 | Waldman | G06F 40/186 715/744 |
| 2010/0031152 A1* | 2/2010 | Villaron | G06F 3/0481 715/731 |
| 2010/0146393 A1 | 6/2010 | Land et al. | |
| 2010/0169784 A1* | 7/2010 | Weber | G11B 27/034 715/731 |
| 2010/0199180 A1 | 8/2010 | Brichter | |
| 2010/0218100 A1* | 8/2010 | Simon | G06F 16/4393 715/731 |
| 2010/0309436 A1 | 12/2010 | Allen, Jr. et al. | |
| 2011/0004563 A1 | 1/2011 | Rauber | |
| 2011/0010628 A1 | 1/2011 | Segal et al. | |
| 2011/0040804 A1 | 2/2011 | Peirce et al. | |
| 2011/0181602 A1 | 7/2011 | Boda et al. | |
| 2011/0191672 A1* | 8/2011 | Schodl | G06F 17/00 715/273 |
| 2011/0196862 A1 | 8/2011 | Bergman et al. | |
| 2011/0225548 A1* | 9/2011 | Callens | G06F 3/0481 715/835 |
| 2011/0271179 A1* | 11/2011 | Jasko | G06F 16/34 715/256 |
| 2011/0295392 A1 | 12/2011 | Cunnington et al. | |
| 2011/0302494 A1* | 12/2011 | Callery | G06F 16/4393 715/732 |
| 2012/0221975 A1 | 8/2012 | Juristovski et al. | |
| 2013/0024772 A1 | 1/2013 | Delia et al. | |
| 2013/0050255 A1 | 2/2013 | Sprang et al. | |
| 2013/0120403 A1 | 5/2013 | Maloney et al. | |
| 2013/0288722 A1 | 10/2013 | Ramanujam et al. | |
| 2014/0344702 A1 | 11/2014 | Edge et al. | |
| 2014/0372894 A1* | 12/2014 | Pandy | G06F 3/0484 715/732 |
| 2015/0033116 A1 | 1/2015 | McKinney et al. | |
| 2015/0095785 A1 | 4/2015 | Edge et al. | |
| 2015/0132735 A1 | 5/2015 | Edge et al. | |
| 2015/0178287 A1 | 6/2015 | Kim | |
| 2015/0346981 A1* | 12/2015 | Johnson | G06F 3/04847 345/419 |
| 2017/0168782 A1* | 6/2017 | Boyd | G06F 8/34 |
| 2019/0295565 A1* | 9/2019 | Basson | G10L 21/16 |

FOREIGN PATENT DOCUMENTS

| | | |
|---|---|---|
| CN | 102112954 A | 6/2011 |
| CN | 102169483 A | 8/2011 |
| CN | 103279259 A | 9/2013 |
| EP | 2068253 A2 | 6/2009 |
| JP | 2004184576 A | 7/2004 |
| JP | 2007188561 A | 7/2007 |
| WO | 0026828 A1 | 5/2000 |
| WO | 2007069557 A1 | 6/2007 |

OTHER PUBLICATIONS

Bederson et al., Pad++: Advances in multiscale interfaces, ACM Proceedings of Conference Companion on Human Factors in Computing Systems, Apr. 24, 1994, pp. 315-316.

Carpenter, et al., What types of learning are enhanced by a cued recall test?, Psychonomic Bulletin and Review, vol. 13, No. 5, 2006, pp. 826-830.

Charmaz, Constructing grounded theory: A practical guide through qualitative analysis, Sage Publications, 2006, 219 pages.

Edge et al., MicroMandarin: Mobile Language Learning in Context, Proceedings of Conference on Human Factors in Computing Systems (CHI), May 7, 2011, pp. 3169-3178.

Edge, et al., HyperSlides: Dynamic presentations prototyping, ACM SIGCHI Conference on Human Factors in Computing Systems, Apr. 29, 2013, 10 pages.

Fourney et al., Gesturing in the Wild: Understanding the effects and implications of gesture-based interaction for dynamic presentations, Proceedings of British Computer Society (BCS) Interaction Specialist Group Conference, Sep. 6, 2010, pp. 230-240.

(56) References Cited

OTHER PUBLICATIONS

Good et al., Zoomable under interfaces as a medium for slide show presentations, Journal of Information Visualization, vol. 1, No. 1, Mar. 2002, pp. 35-49.
Goodwill Community Foundation, Inc., PowerPoint2010: Applying transitions, retrieved from «http://www.gcflearnfree.org/powerpoint2010/6.4», available as early as Jan. 2011, 1 page.
Gouli, et al., An adaptive feedback framework to support reflection, guiding and tutoring, Advances in web-based education: Personalized learning environments, Oct. 2005, 19 pages.
Iqbal et al., Peripheral computing during presentations, Perspective on costs and preferences, Proceedings of Conference on Human Factors in Computing Systems (CHI), May 7, 2011, pp. 891-894.
Kurihara, et al., Presentation sensei: A presentation training system using speech and image processing, Proceedings of Int'l Conference on Multimodal Interfaces (ICMI), Nov. 12, 2007, pp. 358-365.
Lanir et al, Observing presenters' use of visual aids to inform the design of classroom presentation software, Proceedings of Conference on Human Factors in Computing Systems (CHI), Apr. 5, 2008, pp. 695-704.
Latex Community, Beamer linking within document, «http://www.latex-community.org/forum/viewtopic.php?f=4&t=4594», Apr. 2009, pp. 1-6.
Levfasseur et al., Pedagogy meets PowerPoint: A research review of the effects of computer-generated slides in the classroom, National Communication Association, The Review of Communication, vol. 6, No. 1-2, Jan.-Apr. 2006, pp. 101-123.
Lichtschlag, Fly an organic authoring tool for presentations, Proceedings: In Diploma Thesis at the Media Computing Group, Nov. 10, 2008, 114 pages.
Litchtschlag et al., Canvas presentations in the wild, CHI 12 EA, 2012, pp. 537-540.
Litchtschlag et al., Fly: A tool to author planar presentations, Proceedings of Conference on Human Factors in Computing Systems (CHI), Apr. 4, 2009, pp. 547-556.
Litchtschlag et al., Fly: Studying recall, macrostructure understanding, and user experience of canvas presentations, Session: Space: The Interaction Frontier, CHI 2012, May 5-10, 2012, Austin Texas, USA, 4 pages.
Mamykina, et al., Time aura interfaces for pacing, CHI 2001 Conference on Human Factors in Computing Systems, Mar.-Apr. 2001, vol. 3, No. 1, pp. 144-151.
Mayer, et al., Nine ways to reduce cognitive load in multimedia learning, Journal of Educational Psychologist, vol. 38, No. 1, 2003, pp. 43-52.
Mayer, Multimedia learning: Are we asking the right questions?, Journal of Educational Psychologist, vol. 32, No. 1, 1997, pp. 1-19.
Microsoft Corporation, PPTPLex PowerPoint Add-In, «http://www.microsoft.com/en-us/download/details.aspx?id=28558», Dec. 15, 2011, 2 pages.
Microsoft Corporation, Welcome to the Open XML SDK 2.5 CTP for Office, «http://msdn.microsoft.com/en-us/library/office/bb448854.aspx», Mar. 10, 2015, 2 pages.
Moscovich, et al., Customizable presentations, Proceedings of Int'l Conf. on Multimodal Interfaces (ICMI), Nov. 5, 2003, 5 pages.
Nelson et al., Palette: A paper interface for giving presentations, Proceedings of Conference on Human Factors in Computing Systems (CHI), May 1999, pp. 354-361.
Norman, In defense of PowerPoint, «http://www.jnd.org/dn.mss/in_defense_of_p.html», Jan. 2004, 3 pages.
Panjwani, et al., Collage: A presentation tool of school teachers, Proceedings of ACM/IEEE Intl Conf. on Information and Communication Technologies and Development (ICTD), Article No. 20, Dec. 13, 2010, 10 pages.
Parker, Absolute PowerPoint: Can a software package edit out thoughts?, The New Yorker, May 28, 2001, 15 pages.
Raggett, et al., HTML 4.01 Specification, Internet Citation, «https://www.w3.org/TR/html4/», Dec. 24, 1999, 218 pages.
Raggett, HTML Slidy: Slide shows in HTML and XHTML, «http://www.w3.org/Talks/Tools/Slidy2#(1)», W3C, 2013 23 pages.
Reynolds, Presentation Zen: Simple ideas on presentation design and delivery, New Riders, 2008, 234 pages.
Rindsberg, Stephen, Create a PowerPoint presentation from a plain text file, «http://www.pptfaq.com/FAQ00246_Create_a_PowerPoint_presentation_from_a_plain_text_file.htm», PPTools, Jun. 7, 2011, 1 page.
Roberts, Aristotle rhetoric, «http://rhetoric.eserver.org/aristotle/», Alpine Lakes Design, A hypertextual resource compiled by Lee Honeycutt, Sep. 2011, 1 page.
Signer, et al., PaperPoint: A paper-based presentation and interactive paper prototyping tool, Proceedings of Int'l Conf on Tangible and Embedded Interaction (TEI), Feb. 15, 2007, pp. 57-64.
Spicer, et al., NextSlidePlease: Authoring and delivering agile multimedia presentations, Journal of ACM Transactions on Multimedia Computing, Communications, and Applications (TOMCCAP), vol. 2, No. 3, May 2010, 25 pages.
Stack Exchange, Text Sound, embedding sound files, «http://tex.stackexchange.com/questions/51632/embedding-sound-files-into-beamer-presentation-with-media9», Apr. 12, 2012, p. 4.
Stiller, et al., Presentation time concerning system-paced multimedia, Australian Journal of Educational Technology, vol. 27, No. 4, Aug. 2011, pp. 693-708.
Sweller, Cognitive load during problem solving: Effects on learning, Journal of Cognitive Science, vol. 12, No. 2, Apr. 1988, pp. 257-285.
Tam, The design and field observation of a haptic notification system for timing awareness during oral presentations, PHd Thesis Submitted in Partial Fulfillment of the Requirements for the Degree of Master of Science, The University of British Columbia, Vancouver, BC, Canada, Oct. 2012, 120 pages.
Technology Trish Ltd, Tweening in PowerPoint, published Feb. 2, 2010, retrieved at «http://www.pptalchemy.co.uk/Tweeny.html», 2 pages.
Teevan, et al., Displaying mobile feedback during a presentation, Proceedings of Intl Conference on Human-Computer Interaction with Mobile Devices and Services (MobileHCI), Sep. 21, 2012, 4 pages.
W3C, Slidy—A web based alternative to Microsoft PowerPoint, «http://www.w3.org/2006/05/Slidy-Xtech/slidy-xtech06-dsr.pdf», May 14, 2006, pp. 1-13.
Wikipedia, Wikipedia: Digital Dictation, at «https://en.wikipedia.org/wiki/Digital_dictation», Dec. 2015, 3 pages.
Wikipedia, Wikipedia: Laptop, at «https://en.wikipedia.org/wiki/Laptop», Mar. 2017, 23 pages.
Wikipedia, Wikipedia: LaTeX/Presentations, at «https://en.wikipedia.org/wiki/LaTeX/Presentations», Feb. 2017, 14 pages.
Wikipedia, Wikipedia: Microsoft PowerPoint, at «https://en.wikipedia.org/wiki/Microsoft_PowerPoint», Mar. 2017, 5 pages.
Wikipedia, Wikipedia: Presentation Program, at «https://en.wikipedia.org/wiki/Presentation_program», Feb. 2017, 3 pages.
Wozniak, et al., Optimization of repetition spacing in the practice of learning, Journal of Acta Neurobiologiae Experimentalis, vol. 54, No. 1, 1994, pp. 59-62.
Yonge, Translation of Cicero's De Inventione, Treatise on rhetorical invention, at «http://www.classicpersuasion.org/pw/cicero/dnvindex.htm», The orations of Macus Tulius Cicero: Cicero's De Inventione translated by C. D. Yonge, George Bell and Sons, London, vol. 4, 1888, pp. 241-380.
Zongker, Creating animation for presentations, PhD Dissertation, University of Washington, 2003, 228 pages.
Apple Inc., Apple Keynote, retrieved on Feb. 12, 2012 at «http://www.apple.com/iwork/keynote/», Apple Inc., 2013, 4 pages.
Beck et al., Principles behind the Agile Manifesto, retrieved on Feb. 12, 2013 at «http://agilemanifesto.org/principles.html», 2001, 2 pages.
Bohon, How to create a presentation with markdown, retrieved on Mar. 5, 2013 at «http://www.maclife.com/article/howtos/how_create_presentation_markdown», Mac/Life, May 2, 2012, 5 pages.
Carnegie, The quick and easy way to effective speaking: Modern techniques for dynamic communication, Pocket Books, copyright 1962, 112 pages.
Duarte, Slide:ology: The art and science of creating great presentations, O'Reilly Media, 2010, 240 pages.

(56) References Cited

OTHER PUBLICATIONS

Gallo, The presentation secrets of Steve Jobs: How to be insanely great in front of any audience, McGraw Hill, 2010, 128 pages.
Giant Thinkwell Inc., Haiku Deck, retrieved on Feb. 13, 2013 at «http://www.haikudeck.com/», 2012, 2 pages.
Goggle, Google Docs Presentations, Feb. 13, 2013, «http://www.google.com/drive/start/apps.html#product=slides», Google Drive, 3 pages.
Impress.js, retrieved on Feb. 13, 2013 at «http://www.bartaz.github.com/impress.js/#/title», 4 pages.
Lane et al., Café-style PowerPoint: Navigation's conversational touch, retrieved on Mar. 5, 2013 at «http://office.microsoft.com/en-in/powerpoint-help/café-style-powerpoint-navigation-s-conversational-touch-HA010274710.aspx», Microsoft Corporation, 2013, 5 pages.
Mayer, Multi-media learning, New York, Cambridge University Press, 2009, 2nd edition, 162 pages.
Microsoft Corporation, Microsoft PowerPoint, https://products.office.com/en-us/powerpoint, 5 pages.
Nelson et al., Pictorial superiority effect, Journal of Experimental Psychology: Human Learning & Memory, Sep. 1976, vol. 2, pp. 523-528.
Park University Enterprises, Inc., QuickClicks reference guide to Microsoft PowerPoint 2010, Career Track, 2011, 4 pages.
Pavivio, Mental representations: A dual coding approach, Oxford University Press, 1990, 170 pages.
Pecha Kucha 20x20, retrieved Feb. 13, 2013 at «http://www.pechakucha.org/», 2013, 5 pages.
Prezi Inc., Prezi—Ideas matter, retrieved on Feb. 13, 2013 at «http://prezi.com», 2013, 3 pages.
Slideshare Inc,. SlideShare, retreived on Feb. 13, 2013 at «http://www.slideshare.net/», 2013, 9 pages.
Tufte, The cognitive style of PowerPoint: Pitching out corrupts within, 2003, Graphics Press, 28 pages.
Tutorial: An introduction to the magic move transition in Keynote, retrieved Aug. 30, 2013 at «http://www.keynoteclassroom.com/index_files/Tutorial-Magic-Move.html», 2 pages.
Weismann, Presenting to win: The art of telling your story, FT Press, 2009, 268 pages.
Weismann, The power presenter: Technique, style and strategy from America's top speaking coach, Wiley, 2009, 135 pages.
"First Office Action and Search Report Issued in Chinese Patent Application No. 201480077058.4", dated Oct. 8, 2018, 12 Pages.
"International Search Report and Written Opinion Issued in PCT Application No. PCT/CN2014/089866", dated Jun. 29, 2015, 11 Pages.
"Search Report Issued in European Patent Application No. 14904699.7", dated Sep. 22, 2017, 4 Pages.
Sravanthi, et al., "SlidesGen: Automatic Generation of Presentation Slides for a Technical Paper Using Summarization", In Proceedings of the 22th International Flairs Conference, May 19, 2009, pp. 284-289.
"Office Action Issued in European Patent Application No. 14904699.7", dated Oct. 6, 2017, 6 Pages.
"Second Office Action Issued in Chinese Patent Application No. 201480077058.4", dated Jun. 19, 2019, 13 Pages.
"Beamer", Retrieved from https://en.wikipedia.org/wiki/Beamer_(LaTeX), Retrieved on Dec. 12, 2019, 4 Pages.
"Prezi", Retrieved from http://prezi.com/, Retrieved on Dec. 12, 2019, 5 Pages.
"Slidebean", Retrieved from https://slidebean.com/?utm_expid=.X9oflbuwRaWoH1pDRO243A.0&utm_referrer=, Retrieved on Dec. 12, 2019, 4 Pages.
Bubeck, et al., "Provable Guarantees Come to the Rescue to Break Attack-Defense Cycle in Adversarial Machine Learning", Retrieved from https://www.microsoft.com/en-us/research/blog/provable-guarantees-come-to-the-rescue-to-break-attack-defense-cycle-in-adversarial-machine-learning/?OCID=msr_blog_provablyrobust_neurips_hero, Dec. 10, 2019, 8 Pages.
"Third Office Action Issued in Chinese Patent Application No. 201480077058.4", dated Feb. 3, 2020, 10 Pages.

* cited by examiner

Example Template

1. Act I
   a. Context: where am I, and where is it?
   b. Role: who am I in this setting?
   c. Point A: what challenge do I face in this setting?
   d. Point B: where do I want to be?

2. Act II
   a. Key Point 1
      i. Explanation A
         1. Detail i
         2. Detail ii
         3. Detail iii
      ii. Explanation B
         1. Detail i
         2. Detail ii
         3. Detail iii
      iii. Explanation C
         1. Detail i
         2. Detail ii
         3. Detail iii
   b. Key Point 2
      i. Explanation A
         1. Detail i
         2. Detail ii
         3. Detail iii
      ii. Explanation B
         1. Detail i
         2. Detail ii
         3. Detail iii
      iii. Explanation C
         1. Detail i
         2. Detail ii
         3. Detail iii
   c. Key Point 3
      i. Explanation A
         1. Detail i
         2. Detail ii
         3. Detail iii
      ii. Explanation B
         1. Detail i
         2. Detail ii
         3. Detail iii
      iii. Explanation C
         1. Detail i
         2. Detail ii
         3. Detail iii 3. Act III
   a. Call to Action
   b. Conclusion

FIG. 2

SlideSpace

Outline-Oriented

| Hierarchy of Points | Enter up to 3 levels of points | Collections of Content | Illustrate points with media items |
| | Apply design rules by level | | Show embedded or full-screen |

Canvas-Based

| Mapping of Outline | See structure of talk as you build it | Exploration of Layouts | Select text font and box shape |
| | Zoom out to canvas during delivery | | Adjust sizes, directions and spacing |

Slide Synthesis

| Inheritance of Layouts | Include parent and peers | Exploration of Styles | Select hues from harmonious palette |
| | Insert previews and reviews | | Adjust lightness with auto-contrast |

Fig. 4

SlideSpace

Outline-Oriented

Hierarchy of Points
- Enter up to 3 levels of points
- Apply design rules by level

Collections of Content
- Illustrate points with media items
- Show embedded or full-screen

Canvas-Based

Mapping of Outline
- See structure of talk as you build it
- Zoom out to canvas during delivery

Exploration of Layouts
- Select text font and box shape
- Adjust sizes, directions and spacing

Slide Synthesis

Inheritance of Layouts
- Include parent and peers
- Insert previews and reviews

Exploration of Styles
- Select hues from harmonious palette
- Adjust lightness with auto-contrast

Fig. 5

AUTHORING TOOLS FOR SYNTHESIZING HYBRID SLIDE-CANVAS PRESENTATIONS

CROSS REFERENCE TO RELATED APPLICATIONS

This application is a U.S. National Stage of International Patent Application Ser. No. PCT/CN2014/089866, filed Oct. 30, 2014.

BACKGROUND

The slide and canvas metaphors are two ways of helping people to create visual aids for oral presentations. The slide metaphor is characterized by the presentation of a sequence of discrete projection slides. The canvas metaphor is characterized by a single display area that supports a dynamic viewport whose size, content, and path can vary.

Traditionally, in either the slide or canvas metaphors, presentation visuals (e.g., titles, bullets, diagrams) are created manually by positioning and individually styling each element. In other methods, the generation of presentation visuals has been automated such that the logical authoring of presentation content is decoupled from the visual display of the final presentation media.

SUMMARY

The presentation synthesis implementations described herein generally automate the layout and styling of presentation visuals on a 2D canvas, with slides being formed from dynamic transformations of the resulting master canvas. As such a hybrid slide-canvas presentation is synthesized.

In one implementation, a hybrid slide-canvas presentation is synthesized by a computing device where first a hierarchical outline of presentation text elements is received. The received presentation text elements are spatially mapped onto a canvas based on a set of canvas layout and size rules. A presentation slide is then automatically generated for each presentation text element. The generated slide depicts the text element, and reflects a layout consistent with the canvas layout and size rules and a styling of presentation visuals based on a set of slide style rules.

The foregoing is realized via authoring tools for synthesizing a hybrid slide-canvas presentation. These authoring tools provide a distinct advantage as they provide increased usability to a presentation author by striking a balance between a restrictive, yet consistent, rule-base scheme and the author's ability to customize the presentation. As a result, an author can synthesize a presentation that provides both consistency and uniqueness.

It should be noted that the foregoing Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. Its sole purpose is to present some concepts of the claimed subject matter in a simplified form as a prelude to the more detailed description that is presented below.

DESCRIPTION OF THE DRAWINGS

The specific features, aspects, and advantages of the disclosure will become better understood with regard to the following description, appended claims, and accompanying drawings where:

FIG. 2 is an example of a hierarchical narrative template.

FIGS. 4-6 respectively show three exemplary canvas layouts created using different canvas layout and size rule settings.

DETAILED DESCRIPTION

Figure 1:
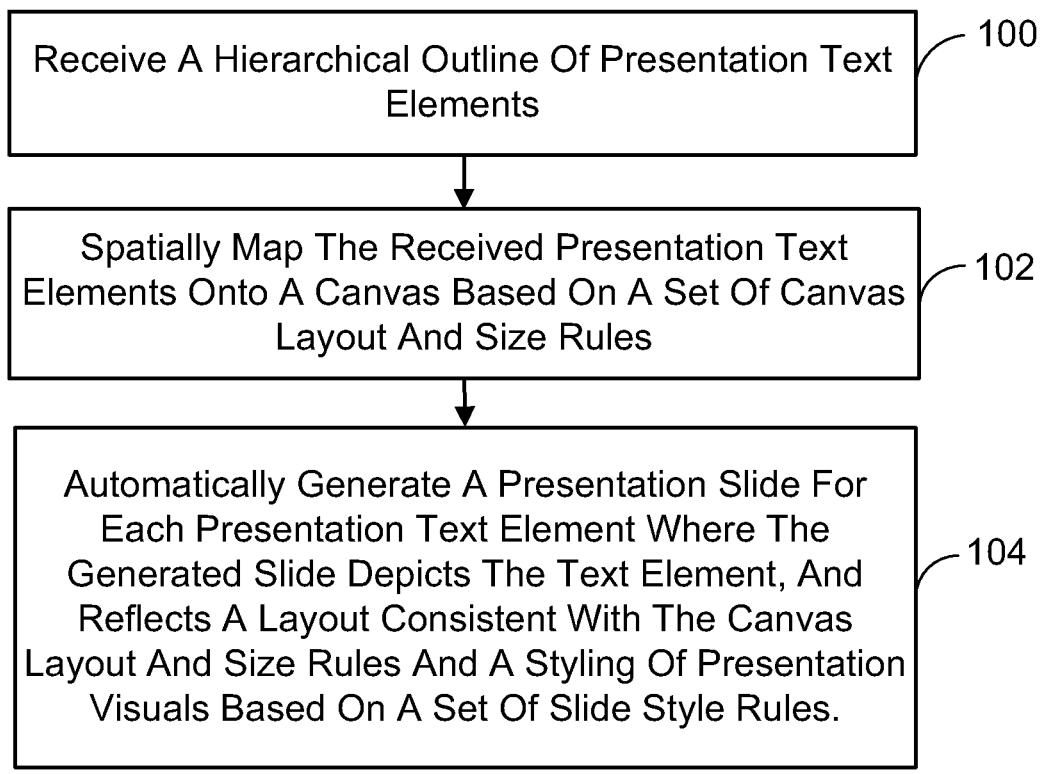
FIG. 1 is a flow diagram illustrating an exemplary implementation, in simplified form, of a process for synthesizing a hybrid slide-canvas presentation.

In the following description reference is made to the accompanying drawings which form a part hereof, and in which are shown, by way of illustration, specific versions in which presentation synthesis implementations can be practiced. It is understood that other implementations can be utilized and structural changes can be made without departing from the scope thereof.

It is also noted that for the sake of clarity specific terminology will be resorted to in describing the presentation synthesis implementations and it is not intended for these implementations to be limited to the specific terms so chosen. Furthermore, it is to be understood that each specific term includes all its technical equivalents that operate in a broadly similar manner to achieve a similar purpose. "Reference herein to one implementation", or "another implementation", or an "exemplary implementation", or an "alternate implementation" means that a particular feature, a particular structure, or particular characteristics described in connection with the implementation can be included in at least one version of the presentation synthesis. The appearances of the phrases "in one implementation", "in another implementation", "in an exemplary implementation", and "in an alternate implementation" in various places in the specification are not necessarily all referring to the same implementation, nor are separate or alternative implementations mutually exclusive of other implementations. Yet furthermore, the order of process flow representing one or more implementations of the presentation synthesis does not inherently indicate any particular order or imply any limitations thereof.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Synthesizing Hybrid Slide-Canvas Presentations

In general, the presentation synthesis implementations described herein automate the layout and styling of presentation visuals on a 2D canvas, with slides being formed from dynamic transformations of a resulting master canvas. As such, a hybrid slide-canvas presentation is synthesized. In one implementation, this involves building the presentation based on a hierarchical outline of textual presentation elements (which will sometimes be referred to herein as "presentation text elements" or simply "elements"). These elements are spatially mapped onto a canvas that provides a master layout for presentation slides, Each element is illustrated by one or more slides that visually combine canvas text and in one version supporting content items (e.g., text, image, video, and so on). A systematic traversal of the text elements determines the slide path. Slides are styled to highlight the current focus element as the presenter moves through the presentation and can be zoomed out to the canvas to give context during delivery.

The mapping of the presentation text elements to the canvas is accomplished using a set of canvas layout and size rules. In addition, the slides are generated using both the set of canvas rules, and a set of slide style rules. The use of these rule set has the advantage of maintaining a consistent visual appearance across the slides, Even though employing the foregoing rules can be restrictive, the author is allowed to customize some aspects of these rule sets. In addition, the rules can be amended to allow for variation between the presentation outline levels. For example, an author can vary the font face, font color, and background color by level so as to emphasize a hierarchical structure of the presentation. Further, in some implementations, summary-like slides can be interjected into the flow of the presentation which reminds viewers what has been covered and/or to inform them of what is to come. This also emphasizes the presentation hierarchy. Still further, in some implementations, the author can add a wide variety of supporting content to the slides. As such, a balance is struck between the restrictiveness of a rule-base scheme and the author's ability to customize the presentation to provide both consistency and uniqueness.

In view of the foregoing, and referring to FIG. 1, one general implementation involves a computer-implemented process for synthesizing a hybrid slide-canvas presentation that uses a computing device to perform the following process actions. First, a hierarchical outline of presentation text elements is received (process action 100). The received presentation text elements are then spatially mapped onto a canvas based on a set of canvas layout and size rules (process action 102). Next, a presentation slide is automatically generated for each presentation text element (process action 104). The generated slides depicts the text element, and reflects a layout consistent with the canvas layout and size rules and a styling of presentation visuals based on a set of slide style rules.

Each of the foregoing features and actions will now be described in more detail in the sections to follow.

1.1 Hierarchical Outline

The presentation synthesis process begins with the creation of a hierarchical outline of points. In general, an author of the presentation enters text representing the presentation points in the form of a series of hierarchical text blocks. In one implementation this involves the use of a hierarchical narrative template that guides the creation of content. For example, in one version, a user interface presents a template for hierarchical outlining of presentation structure that uses a tree metaphor in which each node contains both a box for entering presentable content (e.g., a section or slide title) and the narrative purpose fulfilled by that node (e.g., Key Point 1) according to the chosen narrative template.

An example template is shown in FIG. 2. This template employs the fundamentals of classic story structure and the screenwriting process to structure a presentation in three acts. Namely, a Title, three Acts and a Conclusion. Act 1 includes context, role, point A, and point B. Act 2 includes up to three key points, each with up to three explanations, and each explanation with up to three details. Act 3 is a call to action and conclusion. The presentation author enters content into the sections of the foregoing acts to set up the story of the presentation, develop the action, and frame the resolution. In one version, the elements in a hierarchical narrative template are not fixed. A presentation author can add to the elements, eliminate one of more elements and change the order and levels of the elements as desired.

Employing a narrative structure template to help synthesize a presentation is advantageous in that it allows an author to visualize the phrasing and sequencing of content to suit a particular purpose (e.g., building an argument, telling a mystery story, and so on). In this way a user can determine if this narrative structure will create an intended effect on the audience.

In one implementation, the presentation synthesis described herein also facilitates switching templates in a way that juxtaposes the existing content hierarchy in one template with the new narrative hierarchy in another template. In one version, this is accomplished by displaying a previously prepared template alongside (or below) the desired new template, and allowing the user to drag and drop existing text elements into an element block of the new template.

1.2 Mapping the Presentation Text Elements onto a Presentation Canvas

In one implementation, the text element entered into each of the text blocks is spatially mapped onto a presentation canvas. This results in a master layout for presentation slides and a meaningful basis for animated transitions between the elements, as will now be described.

The mapping process is done automatically based on a set of layout and size rules. In one version, this involves creating rapid prototypes by treating the hierarchical presentation outline as a tree with the presentation title at the root and performing systematic operations based on hierarchical levels of points. For example, a title=level 0; top-level sections=level 1; slides=level 2; bullets=level 3, and so on. Layout and size rules are specified for the whole canvas and/or each consecutive pair of levels. In one version, these rules specify the flow direction of elements, the location of elements at lower levels, the size of fonts at that level, the spacing between the text blocks of elements at the same and lower levels, the font face of text, and the shape of text blocks, among others. Additionally, in one implementation, the presentation author can change the layout and size rules.

For example, in one specific version, the set of layout and size rules between a pair of consecutive levels specifies the following attributes:
  a. The flow of the parent elements (e.g., up, down, left, right, angle X);
  b. The spacing between the parent elements (e.g., in em typography units—width of a capital M at that level's font size);
  c. The location of each parent's children (e.g., above, below, left, right, at angle X, around);
  d. The spacing between each parent and it's children;
  e. The relative change in font size between parent and children or as percentage of title font size; and
  f. Any other style attributes, such as font face, font style, font color, text alignment, text block shape (expressed in complete lines of text), and so on.

1.3 Generating Slides from the Presentation Canvas

In one implementation, a presentation slide is automatically generated for each presentation text element in the presentation outline. In addition, each element depicted in a slide reflects a layout consistent with the previously-described canvas layout and size rules associated with the depicted element, and a styling of its visuals based on a set of slide style rules (which will be described shortly).

In one implementation, not only the presentation text element for which the slide was generated (i.e., the focus presentation text element) is included in the slide, but its peers and parent elements as well. In other words, automatically generating a presentation slide for each presentation text element also involves including one of more other presentation text elements that are of the same hierarchical level as the focus presentation text element, as well as a parent presentation text element of the immediately preceding hierarchical level to the focus presentation text element.

The result of the foregoing is that more than one presentation text element will be depicted on a slide. Given this, in one version, the focus element is emphasized. This is accomplished using the aforementioned slide style rules to impart a different appearance to the text element currently being discussed in comparison to the previewed or reviewed elements. As will be described shortly this differentiating appearance involves choosing a color, size or other font characteristics (or any combination of these attributes) that makes the focus presentation text element stand out from the rest of the depicted elements. The highlighting of the focus presentation text element can be employed anytime there is more than one presentation text element included in a slide.

1.3.1 Previewing and Reviewing Presentation Text Elements

Considering the presentation outline as a tree, the default path of the slide sequence can be a depth-first traversal of that tree. This traversal visits each node (presentation text element) a single time and follows the logic of expansion—after talking about a element, the next element is an elaboration of previous element if one exists, and else the focus flows to the next element. However, effective instructional presentations often give a preview of content to come and/or review content already covered. For example, this can involve, following presentation of parent element, previewing all of the parent's children before moving on to another element. Additionally, this can involve, following the presentation of a parent element's children, reviewing the element before moving on to the next element.

In one implementation, the presentation synthesis described herein automates repeat viewing of presentation content through rules that map the outline to a view path. More particularly, for a given element (or all element of a level), the user is able to make two additional choices about how that element and its direct children are viewed over time. By selecting a "preview children" option, the user indicates that following presentation of an element, all of its children are to be previewed together before resuming the default depth-first traversal. This creates a high-level structure for the presenter to fill in and provides the audience with a roadmap. Additionally, by selecting a "review after children" option, the user indicates that following the traversal of the element's sub-tree, the element should be reviewed before moving on to the next element. As such, the presenter is given an opportunity to summarize the element at the higher level before connecting it to the element that logically follows. Both options increase repetition leading to reinforcement.

1.3.2 Adding Supporting Content

The above-described text-based presentation outline depicted across the generated slides provides the backbone of a presentation and is a convenient representation of the high-level flow and structure. However, in one implementation, additional supporting text content and media is associated with each text element and added to the slides to further illustrate and explain that element. This supporting content appears only when the associated point has the path focus (i.e., the associated presentation text element is currently being described using the slide).

To create a slide from the combination of the canvas layout and the supporting content of the focused point, an author creates a link between a content item and the presentation text element. The linked content item will then be displayed in the slide generated for the associated text element. In one version, the content item is displayed in a content box embedded in the slide. In this case, conventional methods are employed to wrap the associated element text around the content box.

In another version, the content item fills the entire slide. In this case, the text of the associated text element can be styled so as to show through the displayed content item. For example, the content item could be an image or video that is employed as the background of slide. To accomplish this, the content item would be set to a degree of transparency and appropriate lightness (dark or light) that ensures the legibility of the text element. A content item that fills the entire slide can also be set to appear in lieu of the associated text element. For example, this effect can be employed where a presenter uses the content item as a backdrop to a verbal explanation of the element.

In yet another version, the content item associated with a text element is designated by the author as being optional. An optional content item is not initially shown on the side generated for its associated text element, but can be displayed (either in a content box or covering the entire slide as described previously) in response to a command entered by a presenter when the slide is being displayed.

It is noted that the content item can be anything presentable, it can link to stored material or live material. It can be a still image or video. It can be text. It can be audio alone or audio played in combination with a visual display. It can be a webpage, grid view, interactive chart, dashboard, keyframe animation, whiteboard for ad-hoc inking, and so on. And these are just a few examples, in general, a content item can be anything that illustrates and explains the focus element. Further, more one than one content item can be linked to the same text element, in this case, the content items can be played in an orchestrated sequence, or if designated as optional items, played on demand by the presenter.

1.3.3 Slide Style Rules

Slide style rules are generally employed to set the font color of text on a slide, as well as the slide's background color (or transparency level in the case where the background is a content item as described previously). However, in one implementation, the slide style rules allow an author to set these style attributes on a per level basis. Thus, while the same style rules will be used of each slide, they can vary between presentation element levels. For example, higher level elements in the outline can be displayed in the text with a larger size, as well as a unique look and color. This helps the viewer stay focused on the hierarchy of the displayed points. Further, as described previously, the focus text element of the slide can be additionally emphasized (via a unique look and/or color) to stand out, even from other displayed elements of the same level or higher level.

In one implementation, the slide style rules also allow an author to set the style attributes on a per section basis. This involves making the text of the subtrees of a higher-level section appear different for the subtrees of other sections of the same higher level.

1.3.3.1 Color Selection

Many slides include text on a solid background, one or both of which may be colored (i.e., not greyscale). Many slides also include text on an image background. In both cases, good contrast between the foreground text and the background is desirable to ensure the legibility of the slide. It is also desirable to differentiate the various text element levels and to highlight the focus element. Color selection is one way of doing this (as is the selection of a font face).

In one implementation of the presentation synthesis described herein color selection is simplified for the author by creating appropriate dependencies between color models for the various slide elements and items. For example, consider a color model such as HCL (Hue, Chroma, Luminance) that allows the color or "hue" (e.g., red, green, blue, and so on) to be varied independently of the saturation of the color (on a chroma scale of grey to full color) and luminance (on a brightness scale of black to white). Consider an exemplary slide that has a background image, covered by a background box of variable transparency and overlying text and a highlight box also with overlying text. The author makes a series of decisions that progressively builds up a color scheme for the elements and items of the slide. By considering desirable relationships between the colors of these elements and items the contrast between them can be optimized to ensure the legibility of any the text. Moreover, the author can change the brightness (e.g., luminance), color saturation (e.g., chroma) and contrast (or any combination thereof) in ways that do not affect actual color (e.g., hue) choices and vice versa. An example decision sequence is: (1) chroma (greyscale to full color); (2) palette size (number of hues); (3) contrast (between both text-box pairs); (4) regular text lightness (black to color to white); (5) regular text hue (color palette of specified chroma and lightness); (6) box hue (for both boxes, of global chroma and derived lightness); (7) background box transparency; (8) highlight box lightness relative to derived lightness of background box; (9) highlight text hue; (10) highlight box transparency. The background box lightness is derived from regular text lightness and the specified contrast level. If both lighter and darker lightness values are possible, the user can choose either. The highlight box text lightness is similarly derived from the highlight box lightness and the contrast level. Additional colors, e.g., to signify different topics or sections, can be specified though hue selection alone. However, it is noted that the foregoing sequence is just an example and other rule sets are also possible.

It is further noted that whichever abstraction (level vs section) is used to assign one dimension of the color variable (e.g., hue), the other abstraction can systematically manipulate the other (e.g., chroma). The result would be, for example, sections that are differentiated by hue (e.g., red, green, blue) with levels differentiated by colorfullness (from bold colors to muted colors), or vice versa.

1.4 Varying Slide Content Based on Activity

A single presentation is often used for multiple activities. For example, it could be employed for rehearsing the delivery of a presentation, delivering the presentation to a live audience, recording the presentation using a camera or screen capture service, reading the presentation offline, delivering a short version of the presentation, or delivering a long version of the presentation, to name a few. It would be advantageous to vary the level of detail of the presentation to be appropriate for the activity. It would also be advantageous if a presenter could switch between levels of detail during the same presentation, such as in a live presentation where time is running out (e.g., switch to less detail to speed up the presentation) or following an audience request to see examples or data (e.g., switch to more detail in answer to the audience member's request).

In one implementation of the presentation synthesis described herein the foregoing activity-based detail level switching can be accomplished by associating different amounts of content material with the text elements based on the intended activity. More particularly, while all the designated activities would share the same structure and the same high-level outline in this implementation, the supporting content is tailored to the activity. By supporting the authoring of different content packages for different activities (e.g., a few words and simple images for live delivery, paragraphs of text and detailed diagrams for offline reading), the presenter can select the activity prior to the presentation or during the presentation, and have it apply to all the slides. Thus, the content package assigned to the chosen activity will be "played" during the presentation of each slide having such a package linked to its focus text element. Further, as multiple activity-specific content packages can be linked to the individual presentation text elements, the presenter can alternately chose a content package on a slide by slide basis depending on which text element is the focus of that slide.

In one implementation of the presentation synthesis described herein the foregoing activity-based detail level switching can be accomplished by designating which presentation text elements are to be used to generate slides on an activity basis. For example, in one version an element in the presentation outline is tagged with a particular activity or activities. The presenter selects the activity prior to the presentation or during it, and only those text elements having that activity tag are used to generate slides.

1.5 Pre-Defined Packages

The presentation synthesis implementations described herein lend themselves to the use of predefined packages. The aforementioned hierarchical narrative templates are an example of a predefined template package that can be employed. The canvas layout and size rules are another example. Predefined canvas rules packages can be generated for use with the presentation synthesis implementations described herein. For example, certain layouts of the text elements can impart a particular "feel" to a slide depicting multiple element levels (e.g., levels whose text has a negative connotation could be laid-out in a downward flowing stair-step fashion, while text having a positive connotation could be laid-out in a upward flowing stair-step fashion). Similarly, slide style rules can be pre-defined and employed. This includes pre-defined color palettes (e.g., how to systematically color different semantic elements), and pre-defined font schemes (e.g., how to systematically assign font faces, sizes, and styles to different semantic elements). For example, the combination of particular colors and font characteristics can impart a "feel" to a text element level (e.g., dramatic, cool, and so on). Thus, pre-defined color and font schemes designated as imparting a particular "feel" would be advantageous. The previously-described automation of repeat viewing of presentation content through rules that map the outline to a view path (e.g., how to preview, view, and review elements over time) is another aspect that is conducive to the use of pre-defined temporal path packages.

Still further, in one implementation, a high-level presentation package is employed that bundles the foregoing pre-defined packages such that all elements are well matched to the tone and purpose of a presentation type. This approach lets novice users choose an appropriate starting point quickly and experiment freely from that foundation.

It is further noted that the foregoing pre-defined packages could be sourced from other authors. For example, an online gallery could be established where authors would upload the foregoing packages for others to use.

1.6 Exemplary User Interface

Figure 3:
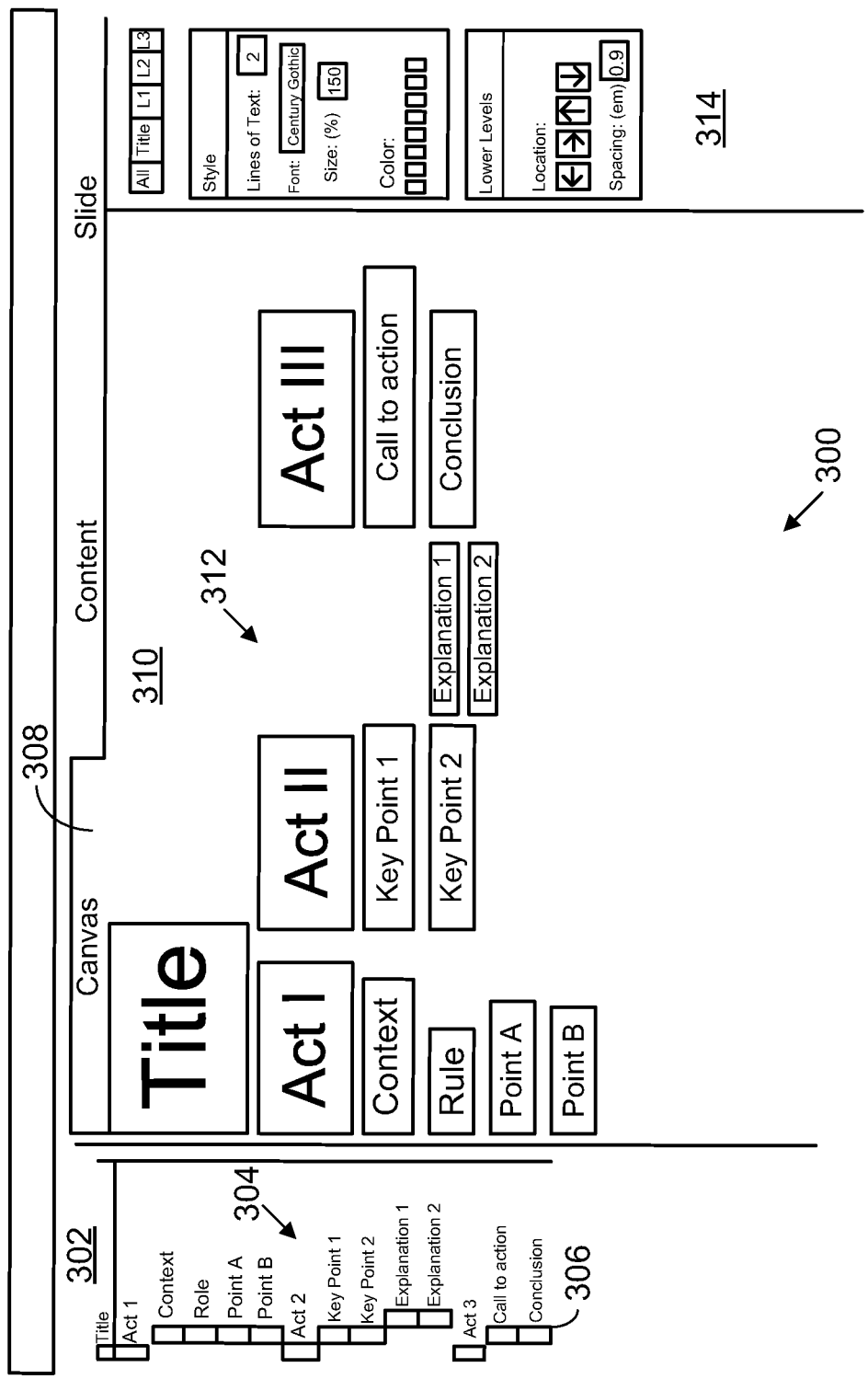
FIG. 3 is an exemplary user interface (UI) for use with the presentation synthesis implementations described herein, which shows a canvas sector displayed in a portion of the presentation synthesis screen.

The presentation synthesis implementations described herein can be realized hi a user interface (UI) framework. One exemplary implementation of a UI is depicted in FIG. 3. An outline editor sector 302 is disposed on the far left hand side of a presentation synthesis screen 300 that is displayed on a display device. The outline editor sector 302 is used by the user to build the hierarchy of text elements described previously. In one version, this involves the author selecting a pre-defined outline structure from a list of locally stored outlines or inputting an outline structure from a remote site (such as one of the hierarchical narrative templates described previously). The selected outline structure 304 is displayed in the outline editor sector 302 and includes a hierarchical list of text entry blocks 306 with labels describing the content that should be entered in that block. The author uses an appropriate input device to enter text into the entry blocks 306 in accordance with the block's label. Alternately, an author can fill in the text blocks of an outline structure outside the presentation synthesis UI and enter it pre-filled into the outline editor sector 302.

In one version of the presentation synthesis UI, the foregoing outline editor sector 302 functions are accomplished using a visual outline editor. This editor also supports the addition of follow-on text elements at any level, as well as direct restructuring of the selected outline structure 304 (e.g., using drag handles). However, in one version the outline structure 304 is limited to three levels to prevent excessive nesting. Further, in one version, the outline structure 304 remains visible in the outline editor sector 302 throughout the authoring process and interactively drives the subsequent activities of designing the presentation canvas, collecting supporting content and generating the presentation slides. In other words, changes made to the outline structure 304 are promulgated in real-time to the presentation canvas and slides. It also provides an implicit path through the hierarchy of points, generating slides in depth-first order.

Figure 6:
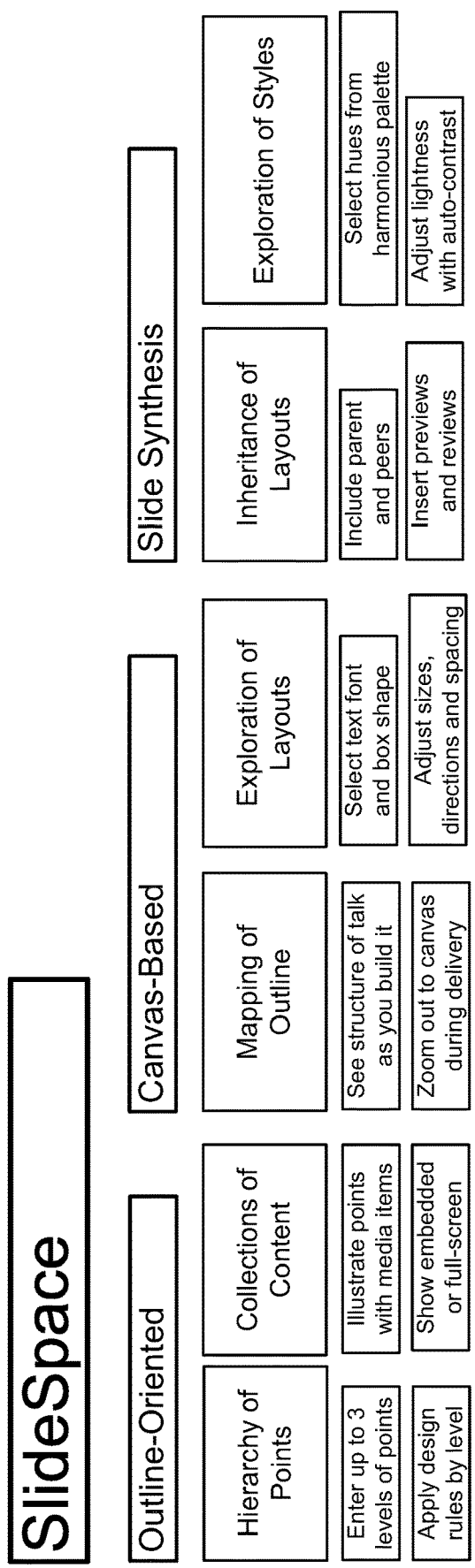

A canvas tab 308, when selected, causes a canvas sector 310 to be displayed in a portion of the presentation synthesis screen 300 to the right of the outline editor sector 302. A spatial canvas 312 is shown in the canvas sector 310. The text elements entered by the author are mapped onto a spatial canvas 312 shown in the canvas sector 310. The spatial canvas depicts the text elements in accordance with the canvas layout and size rules described previously. The canvas sector 310 includes a canvas design panel sub-sector 314. The canvas design panel sub-sector 314 lists the current state of at least some of the canvas layout and size rules, and provides an interface for the user to change these states. Example canvas layouts created from different rule settings are shown in FIGS. 4-6.

In one exemplary version, as an author adds, edits, and removes elements from the outline, the spatial canvas 312 maps the hierarchy into a spatial layout. This layout is constructed automatically and in real-time based on the canvas layout and size rules that can be set for the whole canvas or independently by outline level using the canvas design panel sub-sector 314. These rules specify the flow direction of points (e.g., horizontal or vertical), the location of points at lower levels (e.g., right or down), the size of fonts at that level (e.g., percentage of title font size), the spacing between the text blocks of points at the same and lower levels, the font face of text, and the shape of text blocks (e.g., expressed in complete lines of text). Text boxes align along their left and top edges as appropriate.

Figure 7:
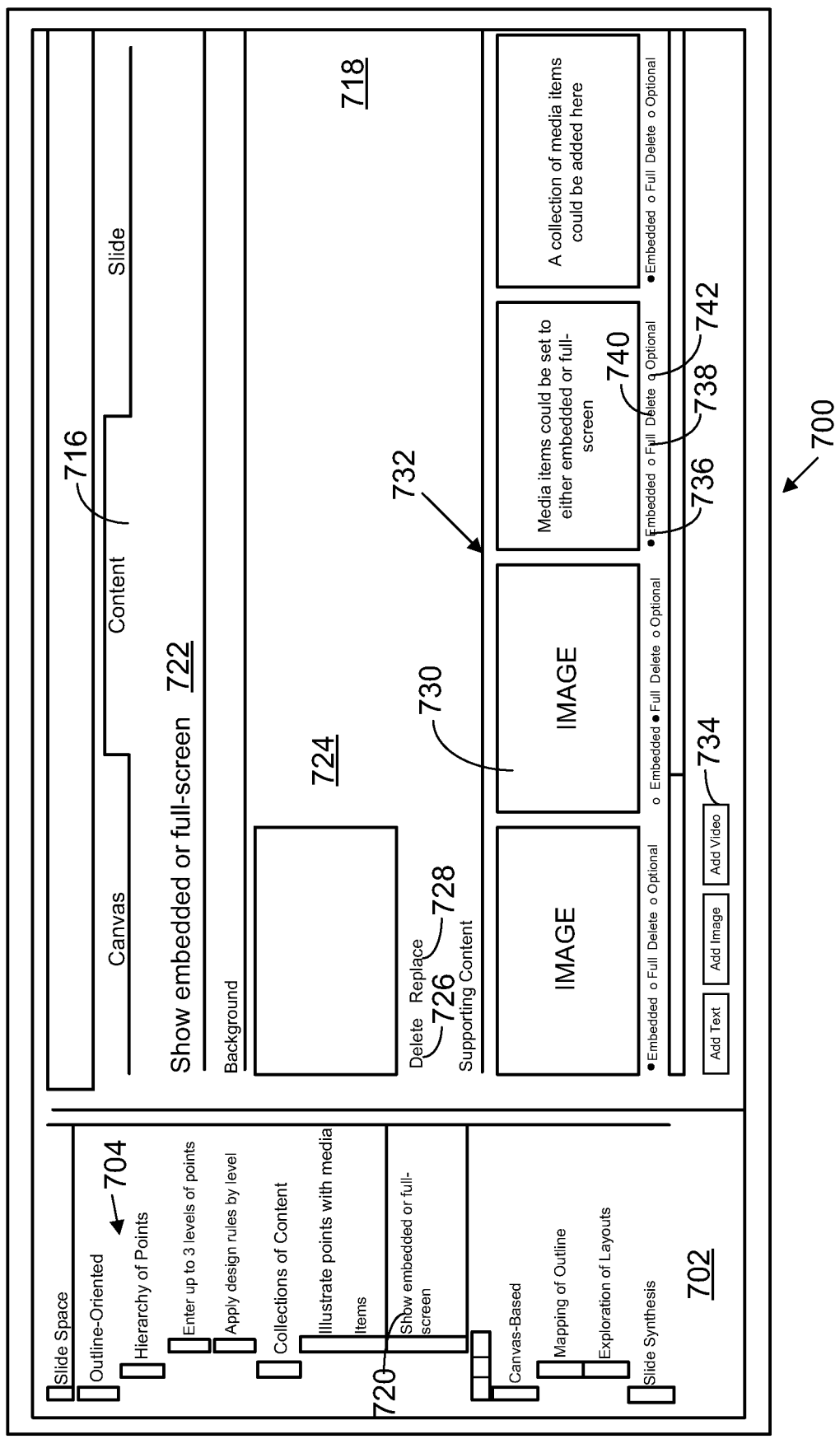
FIG. 7 is an exemplary user interface (UI) for use with the presentation synthesis implementations described herein, which shows a content sector displayed in a portion of the presentation synthesis screen.

Referring now to FIG. 7, when a content tab 716 is selected, a content sector 718 is displayed in the aforementioned portion of the presentation synthesis screen 700 to the right of the of the outline editor sector 702. The content sector 718 is used to link each text element to one or more related content items (text, images, videos, and so on as described previously) whose purpose is to illustrate and explain that element. In general, an author selects a text element in the outline structure 704 and enters one or more content items into the content sector 718 to link them to the element.

In one exemplary version, an author selects an text element 720 in the outline editor sector 702. The text associated with the selected element 720 is displayed in the content sector 718 in a text element sub-sector 722. If a content item (such as an image) is to be used as a background in the slide associated with the selected text element 720, the item is entered into and depicted in a background sub-sector 724 the content sector 718. When an image or video is set as the background of associated slides, a semi-transparent "contrast layer" of the appropriate lightness (black or white) is added to maintain text legibility. Once entered, the background content item can be deleted using a selectable delete button 726 (in which case a solid color background is employed as will be described in more detail later), or replaced with a different background content item using a selectable replace button 728.

If a non-background, supporting content item 730 is to be shown in the slide associated with the selected text dement 720, the item is entered into and depicted in a supporting content sub-sector 732 of the content sector 718. This is accomplished using an appropriate Add button 734. In one exemplary version depicted in FIG. 7, three such add buttons are shown—one for text, one for images and one for videos. If the Add text button is selected, a text box will appears and the author enters the desired text into the box. It is noted that other Add buttons can also be included to add other types of content items. Multiple supporting content items 730 can be entered and linked to the same text dement, as shown in the exemplary version depicted in FIG. 7. Once entered, each content item can be set to appear in a content box embedded in the slide by selecting the Embedded button 736 displayed adjacent to the supporting content item 730. An entered supporting content item 730 can also be set to fill the entire slide by selecting the Fullscreen button 738 displayed adjacent to the content item. A Delete button 740 is also displayed adjacent to the supporting content item, and can be used to remove a previously entered content item. Still further, an Optional button 742 can be displayed adjacent to the supporting content item, and used to designate that the content item is optional and only included in the slide if a presenter directs that it is to be included (as described previously). It is noted that the supporting content items 730 are arranged in the order in which they were entered (if multiple items are entered). Each of the supporting content items 730 linked to a text element 720 is also displayed in the associated slide in the order they were entered.

Figure 8:
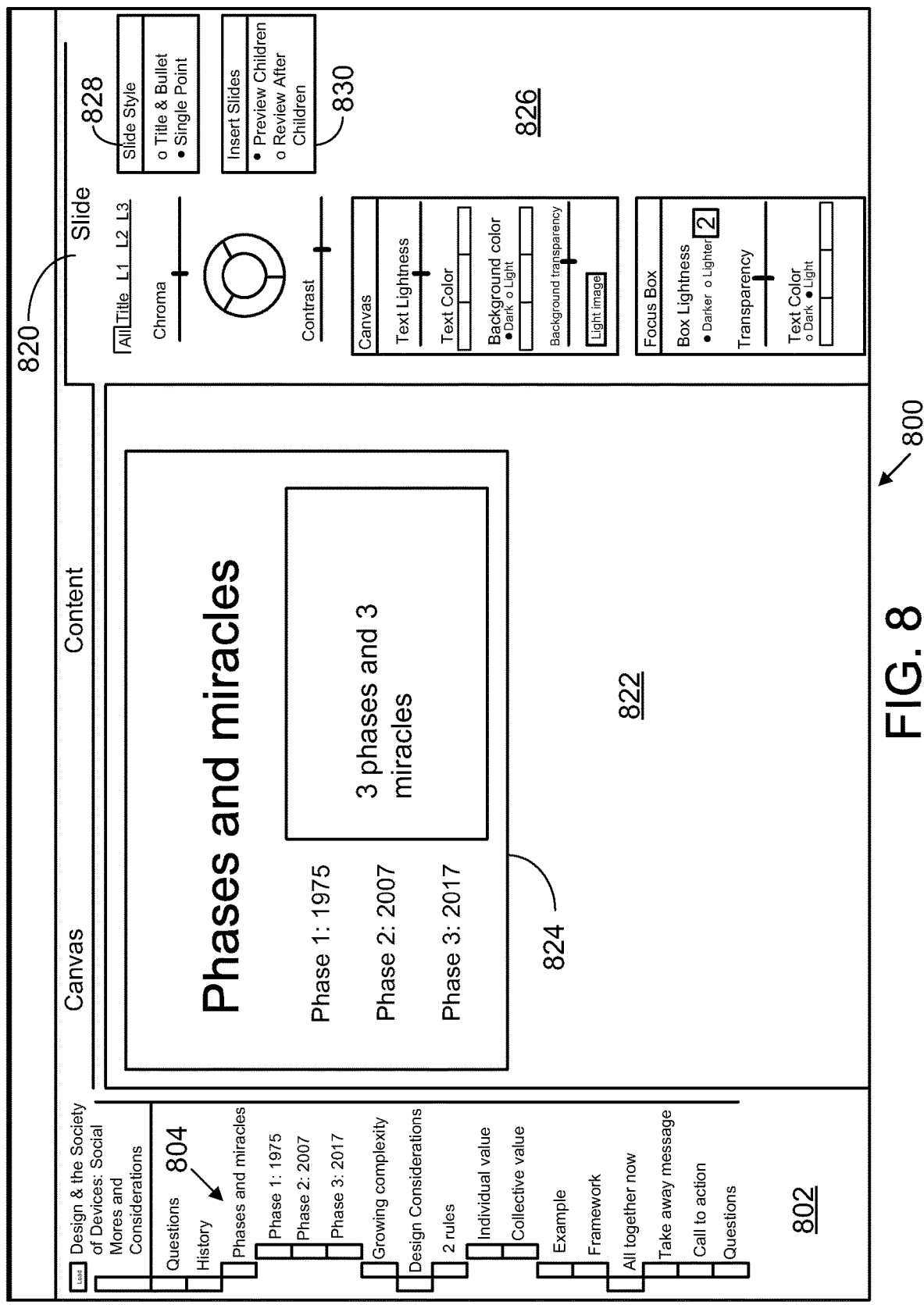
FIG. 8 is an exemplary user interface (UI) for use with the presentation synthesis implementations described herein, which shows a slide sector displayed in a portion of the presentation synthesis screen.

Referring now to FIG. 8, when a slide tab 820 is selected, a slide sector 822 is displayed in the aforementioned portion of the presentation synthesis screen $00 to the right of the of the outline editor sector 802. The slide sector 822 depicts a presentation slide 824 generated for a selected text element based on the combination of the canvas layout and size rules, linked content items and the previously described slide style rules.

In general, an author selects a text element in the outline structure 804 to view the slide generated for that element in the slide sector 822. In one implementation, the slide for a text element is generated as follows. First, text elements are laid-out (as specified by canvas layout and size rules) in the same general configuration as they appear on the canvas. These elements include the selected element plus, optionally, the peers of the selected element already added to the canvas (~bullets) and the parent of the selected element (~headline). The optional nature of the peers and parent elements will be described in more detail shortly. In addition, the text elements are arranged to ensure that there is enough free space for the supporting content box (if any).

A slide layout engine translates text from its canvas positions to make space for an embedded content box and fill the available slide space in a visually-balanced way. Slides at the same level all share the same layout, differing only in the text used and the number of elements shown. When slides are composed to include the peers of the focus text element, in one version the default behavior is one of progressively revealing those peers. For example, if the elements are set to flow vertically (like bullet lists), the text boxes of the focus element and its preceding peers are centered in the available vertical space, adjacent to the supporting content box. Before a new element is added, existing elements shift upwards to make space while retaining a balanced layout. Horizontal elements are simply added in their final position to maintain an aligned left margin at all times. It is also noted that sometimes the text associated with a level or levels being shown on a slide will have only a few words and can look awkward. For example, all the words might just cover a small portion of the left margin of the slide. In one version, this situation is handled by using conventional methods to resize the text of the levels to fill more of the slide. The new sizes of the levels would be promulgated through the rest of the slides as well to maintain consistency across the presentation.

The slide sector 822 includes a slide design panel sub-sector 826. The slide design panel sub-sector 826 lists the current state of at least some of the slide style rules applicable to the displayed slide 824, and provides an interface for the author to change these states. In one version, the aforementioned inclusion of peer and parent text elements is controlled using the slide design panel sub-sector 826. More particularly, in the exemplary slide design panel sub-sector 826 shown in FIG. 8 a slide type selection box 828 is included for this purpose. Two exemplary slide type options are shown-namely single-point style (which does not include any peers or parent elements) and title-and-bullet style (which includes the parent and preceding peers of the focus text element in the outline hierarchy). The ability to select between these two slide types allows the detail level of slides to be adjusted quickly and systematically, e.g., to create strong visual contrasts between slide types or to make the detail level appropriate to the presentation display size (e.g., mobile phone vs. large projection screen). However, it is noted that many other slide styles are possible, and it is not intended that the presentation synthesis implementations described herein be limited to just the two styles shown in FIG. 8. It is further noted that an author can simulate more conventional slides without bullet animation by setting slides at level x to preview their child points and slides at level x+1 to be title-and-bullet style. Since all bullets have already been previewed, the result is a series of slides with identical titles and bullets with the current bullet highlighted.

In one version of the slide design panel sub-sector 826, options for styling color and contrast schemes are included. More particularly, the aforementioned HCL color space is used to create color palettes from which all combinations of foreground and background colors have the same perceptual contrast and can thus be freely interchanged. A primary control simultaneously updates the text and background lightness of all slides hi a way that maintains good contrast, inverting the lighter/darker relationship when passing the midway point. For slides with an image background, a black or white contrast layer is added automatically. The transparency of this layer can also be adjusted using the slide design panel sub-sector 826 (as well as through hotkeys during the presentation). Further, if a supporting content box is included in a slide, it can also be styled using rules, e.g., color, transparency, full-bleed or margin, fit to content or fill with content, and so on). It is noted that the exemplary slide design panel subsector 826 shown in FIG. 8 employs a three hue HCL option (although the actual colors are not shown). However, it is not intended that the presentation synthesis UI be limited to just three hues. Rather, the UI can include other hues as well. For example, in one Implementation, a 12 hue selector replaces the aforementioned three hue selector. The 12 hue selector is depicted as a row of selectable hue blocks, as opposed the circular configuration of the three hue selector shown in FIG. 8.

It is noted that in one implementation, multiple consecutive slides can be displayed in the slide sector 822. This allows the author to see the progression of the presentation in one view. In the multi-slide view mode; an individual displayed slide can be selected and operated on as described previously to adjust its appearance. In addition, in one version, the multiple slides can be displayed in sequence, such as in a raster-order grid pattern. In another version, the author or presenter has the option to view all the slides; or to filter them, such as by level so that only slides whose focus is on a presentation text element of a selected level are displayed.

In one version, the slide design panel sub-sector 826 includes insert slide options for generating the aforementioned preview and review slides used to signal upcoming and already-presented text elements. In general, these options allow customization of the default depth-first outline transversal. More particularly, in the exemplary slide design panel sub-sector 826 shown in FIG. 8 an insert slide selection box 830 is included for this purpose. The activation of the preview and review slide options is done on a level-by-level basis. Opting to "Preview Children" for a selected level will insert slides that show the focus text element of that level along with the text elements of each of its children at the next lower level. A second option is to "Review After Children" which revisits text elements of a selected level after all of their subordinate-level elements have been presented. This allows an outgoing point to be concluded before verbally and visually transitioning to the new point. It is also noted that both insert slide options can be activated at the same time for a selected level if desired, 1.7 In-Presentation Controls The presentation synthesis implementations described herein also support various in-presentation controls that leverage the underlying hierarchy of the presentation media. In one implementation, a standard keyboard-and-mouse type interface is employed by the presenter to control the presentation (although it is not intended to limit the in-presentation controls to such an interface). More particularly, the slides on the prepared path of the presentation can be navigated by pressing the Right and Left keys to move forwards and backwards, respectively. Pressing the Up key while displaying a slide includes an additional level of text elements while maintaining the focus on the current text element. Pressing the O key zooms all the way out to the overview of elements presented so far. Pressing the Up key when the overview is already visible provides the additional visual context of all text elements, even those not yet presented. The same effect can be achieved immediately by pressing the A key. Subsequently pressing the Down key incrementally removes higher element levels. Clicking on any text element navigates directly to the first slide associated with that point. It is noted that in one version, for any of the foregoing transitions motion tweening can be used to automatically animate visible content to smooth out the changes.

If content items associated with an dement are not on the prepared path because they were made optional in the Content tab, pressing the Down key while viewing a slide of the dement linked to the content items allows those items to be browsed in the content box (pressing the Up key returns to the path). Pressing the F key toggles the content box between embedded and full-screen, while pressing the B key brings the background media to the front. The transparency of this background media can be adjusted using an assigned hotkey (e.g., the T key). If the presenter wishes to skip part of the prepared path, perhaps because their talk is running late, they can press the 1, 2, or 3 numeric keys to skip to the next element at level one, two, or three in the hierarchy, respectively.

Overall, all of the animated transitions to preview, review, or introduce content provide a visual cue for the presenter to verbally link points in ways that reinforce the narrative structure.

2.0 Exemplary Operating Environments

Figure 9:
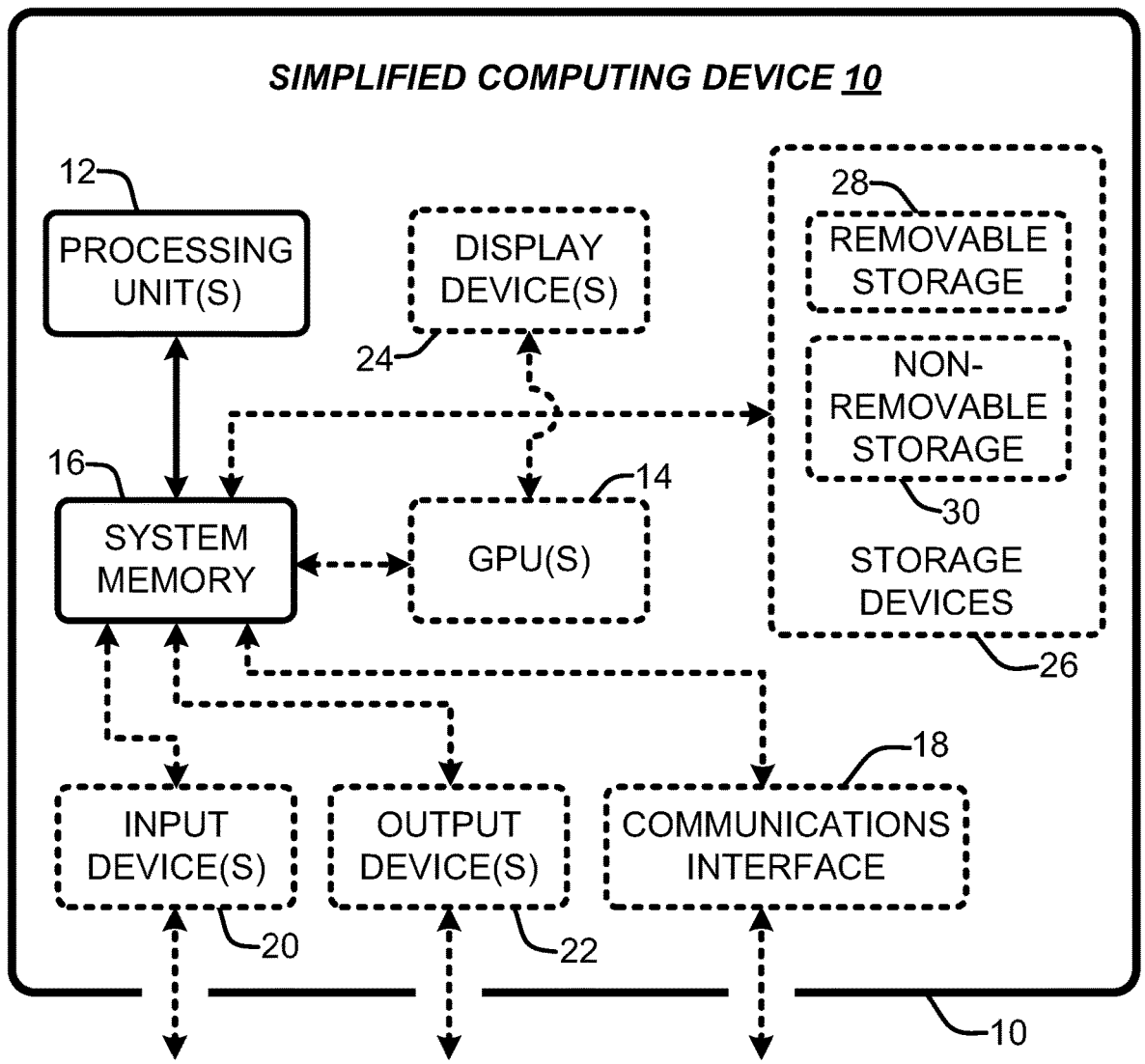
FIG. 9 is a diagram depicting a general purpose computing device constituting an exemplary system for use with the presentation synthesis implementations described herein.

The presentation synthesis implementations described herein are operational using numerous types of general purpose or special purpose computing system environments or configurations. FIG. 9 illustrates a simplified example of a general-purpose computer system with which various aspects and elements of the presentation synthesis, as described herein, may be implemented. It is noted that any boxes that are represented by broken or dashed ones in the simplified computing device 10 shown in FIG. 9 represent alternate implementations of the simplified computing device. As described below, any or all of these alternate implementations may be used in combination with other alternate implementations that are described throughout this document. The simplified computing device 10 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To realize the presentation synthesis implementations described herein, the device should have a sufficient computational capability and system memory to enable basic computational operations. In particular, the computational capability of the simplified computing device 10 shown in FIG. 9 is generally illustrated by one or more processing unit(s) 12, and may also include one or more graphics processing units (GPUs) 14, either or both in communication with system memory 16. Note that that the processing unit(s) 12 of the simplified computing device 10 may be specialized microprocessors (such as a digital signal processor (DSP), a very long instruction word (VLIW) processor, a field-programmable gate array (FPGA), or other micro-controller) or can be conventional central processing units (CPUs) having one or more processing cores.

In addition, the simplified computing device 10 may also include other components, such as, for example, a communications interface 18. The simplified computing device 10 may also include one or more conventional computer input devices 20 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 10 and with any other component or feature of wearable sensing, including input, output, control, feedback, and response to one or more users or other devices or systems associated with presentation synthesis, are enabled by a variety of Natural User Interface (NUI) scenarios. The NU techniques and scenarios enabled by presentation synthesis include, but are not limited to, interface technologies that allow one or more users user to interact with presentation synthesis in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other sensors. Such NUI implementations are also enabled by the use of various techniques including, but not limited to, information derived from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI Information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited, the use of various predictive machine intelligence processes that evaluate current or past user behaviors, inputs, actions, etc., either alone or hi combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the presentation synthesis implementations described herein.

However, it should be understood that the aforementioned exemplary NUI scenarios may be further augmented by combining the use of artificial constraints or additional signals with any combination of NUI inputs. Such artificial constraints or additional signals may be imposed or generated by input devices such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such Information derived from these types of artificial constraints or additional signals may be combined with any one or more NUI inputs to initiate, terminate, or otherwise control or interact with one or more inputs, outputs, actions, or functional features of the presentation synthesis implementations described herein.

The simplified computing device 10 may also include other optional components such as one or more conventional computer output devices 22 (e.g., display device(s) 24, audio output devices, video output devices, devices for transmitting wired or wireless data transmissions, and the like). Note that typical communications interfaces 18, input devices 20, output devices 22, and storage devices 26 for general-purpose computers are well known to those skilled in the art, and will not be described in detail herein.

The simplified computing device 10 shown in FIG. 9 may also include a variety of computer-readable media. Computer-readable media can be any available media that can be accessed by the computer 10 via storage devices 26, and can include both volatile and nonvolatile media that is either removable 28 and/or non-removable 30, for storage of information such as computer-readable or computer-executable instructions, data structures, program modules, or other data. Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. Note that the terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various presentation synthesis implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, or media.

The presentation synthesis implementations described herein may be further described in the general context of computer-executable instructions, such as program modules, being executed by a computing device. Generally, program modules include routines, programs, objects, components, data structures, and the like, that perform particular tasks or implement particular abstract data types. The presentation synthesis implementations described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

3.0 Other Implementations

It is noted that any or all of the aforementioned implementations throughout the description may be used in any combination desired to form additional hybrid implementations. In addition, although the subject matter has been described in language specific to structural features and/or methodological acts, it is to be understood that the subject matter defined hi the appended claims is not necessarily limited to the specific features or acts described above.

Rather, the specific features and acts described above are disclosed as example forms of implementing the claims.

What has been described above includes example implementations. It is, of course, not possible to describe every conceivable combination of components or methodologies for purposes of describing the claimed subject matter, but one of ordinary skill hi the art may recognize that many further combinations and permutations are possible. Accordingly, the claimed subject matter is intended to embrace all such alterations, modifications, and variations that fall within the spirit and scope of the appended claims.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will &so be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

4.0 Claim Support and Further Impementations

The following paragraphs summarize various examples of implementations which may be claimed in the present document. However, it should be understood that the implementations summarized below are not intended to limit the subject matter which may be claimed in view of the foregoing descriptions. Further, any or all of the implementations summarized below may be claimed in any desired combination with some or all of the implementations described throughout the foregoing description and any implementations illustrated in one or more of the figures, and any other implementations described below. In addition, it should be noted that the following implementations are intended to be understood in view of the foregoing description and figures described throughout this document.

In one implementation, a computer-implemented process is employed for synthesizing a hybrid slide-canvas presentation that uses a computing device to perform the following process actions. First, a hierarchical outline of presentation text elements is received. The received presentation text elements are then spatially mapped onto a canvas based on a set of canvas layout and size rules. Next, a presentation slide is automatically generated for each presentation text element. Each of the generated slides reflects a layout consistent with the canvas layout and size rules and a styling of presentation visuals based on a set of slide style rules.

In one version, the process further includes receiving links to one or more supporting content items and an indicator for each supporting content item as to which presentation text element it is assigned to, and the process action of automatically generating a presentation slide for each presentation text element, further includes, for each presentation text element having one or more supporting content items assigned to it, establishing a supporting context box in the presentation slide generated for the presentation text element and displaying each of the one or more supporting content items assigned thereto in the supporting content box.

In one version, the process further includes receiving links to one or more supporting content items and an indicator for each supporting content item as to which presentation text element it is assigned to, and the process action of automatically generating a presentation slide for each presentation text element, further includes, for each presentation text element having a supporting content item assigned to it, displaying the supporting content item assigned thereto as a background of the presentation slide generated for the presentation text element.

In one version, the process action of displaying a supporting content item as the background of a presentation slide, further includes setting a degree of transparency and lightness that ensures the legibility of the presentation text element.

In one version, the process further includes receiving links to one or more supporting content items, an indicator for each supporting content item as to which presentation text element it is assigned to, and an indicator for each supporting content item as to whether it is optional, and the process action of automatically generating a presentation slide for each presentation text element, further includes, for each presentation text element having one or more optional supporting content items assigned to it, for each of the one or more optional supporting content items, only establishing a supporting context box in the presentation slide generated for the presentation text element and displaying each of the one or more optional supporting content items assigned thereto in the supporting content box, upon receipt of an instruction to do so.

In one version, the process further includes receiving links to one or more supporting content items, an indicator for each supporting content item as to which presentation text element it is assigned to, and an indicator for each supporting content item as to whether it is optional, and the process action of automatically generating a presentation slide for each presentation text element, further includes, for each presentation text element having an optional supporting content item assigned to it, only displaying the supporting content item assigned thereto as a background of the presentation slide generated for the presentation text element, upon receipt of an instruction to do so.

In one version, the process action of receiving the hierarchical outline of presentation text elements, includes receiving a template for hierarchical outlining of presentation structure that uses a tree metaphor in which each node includes a box for presentable content and the purpose fulfilled by that node; and receiving a presentation text element for each of at least some of the presentable content boxes of the template.

In one version, the process action of receiving the hierarchical outline of presentation text elements, further includes at least one of: receiving an instruction to add a node to the template, along with a presentation text element for the added node, and adding the node and its presentation text element to the template; or receiving an instruction to delete a node of the template, and deleting that node; or receiving an instruction to reorder a node of the template, and reordering that node; or receiving an instruction to change the hierarchical level of a node of the template, and changing the level of that node.

In one version, the canvas layout and size rules include at least one of: a rule that specifies a flow direction of the presentation text elements; or a rule that specifies a location of presentation text elements at lower hierarchical levels; or a rule that specifies a size of text fonts at each hierarchical level; or a rule that specifies a spacing between the presentation text elements at the same and lower hierarchical levels; or a rule specifying a text font face for the presentation text elements at each hierarchical level.

In one version, the slide style rules include a rule that specifies the color of presentation text elements for each hierarchical level and a rule that specifies the background color of each slide.

In one version, the canvas layout and size rules and slide style rules are changeable, and the process further includes: receiving change instructions specifying changes to the canvas layout and size rules, or slide style rules, or both; and implementing the received change instructions.

In one version, the process action of automatically generating a presentation slide for each presentation text element, involves including one of more other presentation text elements that are of the same hierarchical level as the focus presentation text element, as well as a parent presentation text element of the immediately preceding hierarchical level to the focus presentation text element.

In one version, the process further includes generating additional presentation slides which include: one or more preview slides each of which includes the focus presentation text element and each child presentation text element associated with the focus element, wherein each of the preview slides is generated following the generation of a slide associated with the focus text element; or one or more review slides each of which includes a parent presentation text element associated with one or more child presentation text elements, wherein each of the review slides is generated following the generation of a slide associated with the last of the child presentation text elements to have a slide generated for it; or both one or more preview slides and one or more review slides.

In one version, the process further includes: receiving links to one or more supporting content items, an indicator for each supporting content item as to which presentation text element it is assigned to, and an indicator for each supporting content item designating a presentation activity it is associated with; and receiving an instruction specifying a presentation activity of interest; and the process action of automatically generating a presentation slide for each presentation text element, further includes, for each presentation text element having one or more supporting content items assigned to it and which are associated with the specified presentation activity of interest, establishing a supporting context box in the presentation slide generated for the presentation text element and displaying each of the one or more supporting content items assigned thereto which are associated with the specified presentation activity of interest in the supporting content box.

In one version, the process further includes receiving an instruction specifying a presentation activity of interest, and the process action of receiving the hierarchical outline of presentation text elements further includes receiving an indicator for each presentation text element designating an presentation activity it is associated with, and the process action of spatially mapping the received presentation text elements onto a canvas based on a set of canvas layout and size rules further includes only mapping those presentation text elements associated with the specified presentation activity of interest onto the canvas.

In various implementations, a presentation synthesizing process is implemented by a step for synthesizing a hybrid slide-canvas presentation.

For example, in one implementation, the presentation synthesizing process includes using a computing device to perform the following process actions: a receiving step for receiving a hierarchical outline of presentation text elements; a mapping step for spatially mapping the received presentation text elements onto a canvas based on a set of canvas layout and size rules: and a generating step for automatically generating a presentation slide for each presentation text element, each of the generated slides reflecting a layout consistent with the canvas layout and size rules and a styling of presentation visuals based on a set of slide style rules.

Wherefore, what is claimed is:

1. A computer-implemented process for synthesizing a hybrid slide-canvas presentation, comprising the actions of:
using a computing device to perform the following process actions:
receiving a hierarchical outline including a plurality of presentation text elements arranged according to a hierarchy including a plurality of different levels;
presenting, in a user interface displayed by the computing device, a canvas including the plurality of presentation text elements spatially mapped onto the canvas based on the hierarchy of the hierarchical outline and a set of canvas layout and canvas size rules comprising at least one of a rule that specifies a flow direction of the presentation text elements, a rule that specifies a location of presentation text elements at lower hierarchical levels, a rule that specifies a size of text fonts at each hierarchical level, a rule that specifies a spacing between the presentation text elements at the same and lower hierarchical levels, and a rule specifying a text font face for the presentation text elements at each hierarchical level; and
automatically generating a plurality of presentation slides separate from the canvas and ordered based on the hierarchy of the hierarchical outline, each presentation slide corresponding to a different presentation text element of the plurality of presentation text elements, each presentation slide reflecting a layout consistent with the canvas layout and canvas size rules and a styling of presentation visuals based on a set of slide style rules that vary between presentation slides on a per level basis for different levels of the hierarchy.

2. The computer-implemented process of claim 1, further comprising a process action of receiving links to one or more supporting content items and an indicator for each supporting content item as to which presentation text element the supporting content item is assigned to, and wherein the process action of automatically generating a presentation slide for each presentation text element, further comprises, for each presentation text element having one or more supporting content items assigned to the presentation text element, establishing a supporting context box in the presentation slide generated for the presentation text element and displaying each of the one or more supporting content items assigned thereto in the supporting content box.

3. The computer-implemented process of claim 1, further comprising a process action of receiving links to one or more supporting content items and an indicator for each supporting content item as to which presentation text element the supporting content item is assigned to, and wherein the process action of automatically generating a presentation slide for each presentation text element, further comprises, for each presentation text element having a supporting content item assigned to the presentation text element, displaying the supporting content item assigned thereto as a background of the presentation slide generated for the presentation text element.

4. The computer-implemented process of claim 3, wherein the process action of displaying the supporting content item as the background of a presentation slide, further comprises setting a degree of transparency and lightness that ensures legibility of the presentation text element.

5. The computer-implemented process of claim 1, further comprising a process action of receiving links to one or more supporting content items, an indicator for each supporting content item as to which presentation text element the supporting content item is assigned to, and an indicator for each supporting content item as to whether the supporting content item is optional, and wherein the process action of automatically generating a presentation slide for each presentation text element, further comprises, for each presentation text element having one or more optional supporting content items assigned to the presentation text element, for each of the one or more optional supporting content items, only establishing a supporting context box in the presentation slide generated for the presentation text element and displaying each of the one or more optional supporting content items assigned thereto in the supporting content box, upon receipt of an instruction to do so.

6. The computer-implemented process of claim 1, further comprising a process action of receiving links to one or more supporting content items, an indicator for each supporting content item as to which presentation text element the supporting content item is assigned to, and an indicator for each supporting content item as to whether the supporting content item is optional, and wherein the process action of automatically generating a presentation slide for each presentation text element, further comprises, for each presentation text element having an optional supporting content item assigned to the presentation text element, only displaying the supporting content item assigned thereto as a background of the presentation slide generated for the presentation text element, upon receipt of an instruction to do so.

7. The computer-implemented process of claim 1, wherein the process action of receiving the hierarchical outline of presentation text elements, comprises the actions of:
receiving a template for hierarchical outlining of presentation structure that uses a tree metaphor in which each node comprises a box for presentable content and the purpose fulfilled by that node; and
receiving a presentation text element for each of at least some of the presentable content boxes of the template.

8. The computer-implemented process of claim 7, wherein the process action of receiving the hierarchical outline of presentation text elements, further comprises at least one of the actions of:
receiving an instruction to add a node to the template, along with a presentation text element for the added node, and adding the node and its presentation text element to the template; or
receiving an instruction to delete a node of the template, and deleting that node; or
receiving an instruction to reorder a node of the template, and reordering that node; or
receiving an instruction to change the hierarchical level of a node of the template, and changing the level of that node.

9. The computer-implemented process of claim 1, wherein the slide style rules comprise:
a rule that specifies the color of presentation text elements for each hierarchical level; and
a rule that specifies the background color of each slide.

10. The computer-implemented process of claim 1, wherein the canvas layout and canvas size rules and slide style rules are changeable, the process further comprising the process actions of:
receiving change instructions specifying changes to the canvas layout and canvas size rules, or slide style rules, or both; and
implementing the received change instructions.

11. The computer-implemented process of claim 1, wherein the process action of automatically generating a presentation slide for each presentation text element, comprises an action of including one or more other presentation text elements that are of the same hierarchical level as a focus presentation text element, as well as a parent presentation text element of the immediately preceding hierarchical level to the focus presentation text element.

12. The computer-implemented process of claim 1, further comprising a process action of generating additional presentation slides which comprise:
one or more preview slides each of which includes a focus presentation text element and each child presentation text element associated with the focus presentation text element, wherein each of said preview slides is generated following the generation of a slide associated with the focus presentation text element; or
one or more review slides each of which includes a parent presentation text element associated with one or more child presentation text elements, wherein each review slide is generated following the generation of a slide associated with the last of the child presentation text elements; or
both one or more preview slides and one or more review slides.

13. The computer-implemented process of claim 1, further comprising the process actions of:
receiving links to one or more supporting content items, an indicator for each supporting content item as to which presentation text element the supporting content item is assigned to, and an indicator for each supporting content item designating a presentation activity the supporting content item is associated with; and receiving an instruction specifying a presentation activity of interest; and wherein the process action of automatically generating a presentation slide for each presentation text element, further comprises, for each presentation text element having one or more supporting content items assigned to the presentation text element and which are associated with the specified presentation activity of interest, establishing a supporting context box in the presentation slide generated for the presentation text element and displaying each of the one or more supporting content items assigned thereto which are associated with the specified presentation activity of interest in the supporting content box.

14. The computer-implemented process of claim 1, further comprising a process action of receiving an instruction specifying a presentation activity of interest, wherein the process action of receiving the hierarchical outline of presentation text elements further comprises receiving an indicator for each presentation text element designating a presentation activity the presentation text element is associated with, and wherein the process action of spatially mapping the received presentation text elements onto the canvas based on the set of canvas layout and canvas size rules further comprises only mapping those presentation text elements associated with the specified presentation activity of interest onto the canvas.

15. The computer-implemented process of claim 1, wherein the hierarchical outline of presentation text elements is built by a user in an outline editor user interface displayed by the computing device.

16. A method, comprising:
displaying an outline editor user interface;
recognizing a hierarchical outline including a plurality of presentation text elements built using the outline editor user interface and arranged according to a hierarchy including a plurality of levels; and
automatically generating a plurality of different presentation slides separate from the outline editor user interface and ordered based on the hierarchy of the hierarchical outline, each different presentation text element of the plurality of presentation text elements corresponding to a different presentation slide, each different presentation slide being automatically generated by spatially mapping a corresponding presentation text element onto a canvas based on a set of canvas layout and canvas size rules comprising at least one of a rule that specifies a flow direction of the presentation text elements, a rule that specifies a location of presentation text elements at lower hierarchical levels, a rule that specifies a size of text fonts at each hierarchical level, a rule that specifies a spacing between the presentation text elements at the same and lower hierarchical levels, and a rule specifying a text font face for the presentation text elements at each hierarchical level, and at least one presentation slide of the plurality of different presentation slides including a plurality of presentation text elements in a same level of the hierarchy.

17. A computer, comprising:
a graphic processing unit;
a computer processing device; and
a computer storage device storing instructions that, when executed by the computer processing device, cause the computer processing device to:
render an outline editor user interface using the graphic processing unit;
recognize a hierarchical outline including a plurality of presentation text elements built using the outline editor user interface and arranged according to a hierarchy including a plurality of levels; and
automatically generate a plurality of different presentation slides separate from the outline editor user interface and ordered based on the hierarchy of the hierarchical outline, each different presentation slide corresponding to a different presentation text element of the plurality of presentation text elements, each different presentation slide being automatically generated by spatially mapping a corresponding presentation text element onto a canvas based on a set of canvas layout and canvas size rules comprising at least one of a rule that specifies a flow direction of the presentation text elements, a rule that specifies a location of presentation text elements at lower hierarchical levels, a rule that specifies a size of text fonts at each hierarchical level, a rule that specifies a spacing between the presentation text elements at the same and lower hierarchical levels, and a rule specifying a text font face for the presentation text elements at each hierarchical level, wherein at least one different presentation slide of the plurality of different presentation slides includes a plurality of presentation text elements, and wherein a presentation text element of focus for which the at least one different presentation slide is generated has a different visual styling than other presentation text elements of the plurality of presentation text elements in the at least one different presentation slide.

18. The computer of claim 17, wherein each different presentation slide is automatically generated by spatially mapping the corresponding presentation text element onto the canvas based on the set of canvas layout and canvas size rules, wherein the canvas is displayed via a canvas user interface rendered by the graphic processing unit.

* * * * *